United States Patent
Graham et al.

[11] Patent Number: 5,821,464
[45] Date of Patent: Oct. 13, 1998

[54] ADJUSTABLE SECTION LENGTH FOR POWER BUSWAY DISTRIBUTION SYSTEM

[75] Inventors: Eric J. Graham, Farmington, Conn.; Clarence W. Walker, Selmer, Tenn.; Louis A. Rosen, Wallingford, Conn.

[73] Assignee: General Electric Company, New York, N.Y.

[21] Appl. No.: 702,774

[22] Filed: Aug. 23, 1996

[51] Int. Cl.[6] .................................................. H02G 5/04
[52] U.S. Cl. ...................... 174/86; 174/88 B; 174/99 B
[58] Field of Search ............................ 174/88 B, 70 B, 174/71 B, 99 B, 86, 72 B

[56] References Cited

U.S. PATENT DOCUMENTS

| | | | |
|---|---|---|---|
| 3,031,521 | 4/1962 | Krauss et al. | 174/88 |
| 3,389,213 | 6/1968 | Niemoller | 174/88 B |
| 3,458,647 | 7/1969 | Fouse | 174/84 R |
| 3,459,872 | 8/1969 | Weimer et al. | 174/71 B |
| 3,462,541 | 8/1969 | Davis et al. | 174/88 |
| 4,579,475 | 4/1986 | Hart-Smith et al. | 403/312 |
| 5,038,257 | 8/1991 | Agabekov | 174/72 B X |
| 5,053,584 | 10/1991 | Chojnowski | 174/99 B |

OTHER PUBLICATIONS

Published international Application WO 96/29768, Klockner–Moeller GmbH, Sep. 1996.
Publoshed International Application WO 96/29769, Klockner–Moeller GmbH, Sep. 1996.
U.S. application Ser. No. 08/411,256, filed on Mar. 27, 1995, Graham et al.
U.S. Application—General Electric Company Docket No. 41PR–7353, Ser. No. 08/692564, Filed Aug. 6, 1996, Graham et al.

*Primary Examiner*—Kristine L. Kincaid
*Assistant Examiner*—Marc D. Machtinger
*Attorney, Agent, or Firm*—Carl B. Horton; Hanh T. Pham

[57] ABSTRACT

A power busway distribution section length which may be adjusted before, during, or after installation to better facilitate proper busway location and reduce installation and modification costs. The section length comprises two busway stubs which slide independently between a center busway splice-plate joint. Overlapping sheet metal enclosures are used to provide protection from inadvertent contact with live bus bars and allow the busway section length to be adjusted to a discrete length.

8 Claims, 8 Drawing Sheets

ADJUSTABLE SECTION LENGTH FOR POWER BUSWAY DISTRIBUTION SYSTEM

BACKGROUND OF THE INVENTION

Our invention relates to an adjustable length busway section of a busway system

Power busway systems are typically used for the distribution of electrical power within industrial buildings. Such busway systems include several assembled sections of busway configured to fit within the confines of the building. Each assembled busway section is made up of individual sections of a fixed length, assembled together at the final installation location. Busway lengths vary according to building configurations. They are determined from the building specifications, requiring accurate measurements and designs. Installation of busway systems can be more cost-efficient if a wide range of overall section lengths can be used and the section lengths can be adjusted. This design would facilitate easy adjustments to busway lengths during and after assembly, eliminating the need for field modification of a standard length unit or for specialized lengths to be fabricated prior to final installation.

U.S. Pat. No. 3,031,521 entitled "Busway System" describes an adjustable bus duct unit intended for the same purpose. In accordance with this invention, the busway system includes an adjustable length section with parallel bus bar conductors with portions in overlapping slidable contacting engagement, and clamping means extending transversely of the busway housing to clamp the overlapped bus bar ends together. This construction method requires modification of the bus bars in the adjusting region as well as external clamping means to facilitate proper mechanical stability.

U.S. Pat. No. 3,462,541 entitled "Adjustable Length Straight Section For Bus Duct" describes an adjustable bus duct unit having two identical housing sections connected end-to-end by an intermediate connecting means. The focus of this patent is a low impedance configuration and reduction in the overall adjustability of the design to a limited range due to the use of multiple offset bars per phase. The adjustable straight length section of this patent also requires external clamping means and a multitude of telescoping housing members for increased stability. This complex design requires specialized extruded metal and molded insulators as well as many cost-prohibitive processes for construction and later field modifications.

OBJECTS OF THE INVENTION

Accordingly, it is an object of this invention to provide a novel construction for an adjustable length busway section with a large amount of linear adjustability within the most compact busway package available.

A further object is to provide an adjustable busway section length and support in which no external parts need be removed or joined to provide sufficient mechanical stability.

Still another object is to provide a simple and cost-effective adjustable busway section design which requires no specialized parts and utilizes no cost-prohibitive processes.

SUMMARY OF THE INVENTION

The invention, accordingly, provides an improvement over the prior art by utilizing a multi-piece telescoping housing design with one center housing and two external side housing pieces which are slidably attached to the center housing piece by fasteners. Attached to each external side housing piece is a set of bus bar conductors. As the external housing sections slide over the center section, the bus bars move along with the side housing pieces to vary the effective length of the bus section. Clamping means, such as a splice-plate style pressure joint, is used in the middle of the bus section to connect the adjoining bus bars and provide electrical conductivity and improved mechanical stability. The bus bars within the housing are laterally offset to allow the bus bars on opposing sides of the pressure joint to retain a center-line alignment.

BRIEF DESCRIPTION OF THE DRAWINGS

FIGS. 2 and 3 are isometric views of an adjustable length section in accordance with the instant invention. In FIG. 2, the adjustable length section is in its shortest configuration. In FIG. 3, the section is in its longest configuration.

FIG. 4 shows the adjustable length section in its shortest configuration. FIG. 5 shows the section in its longest configuration.

FIG. 6 shows the adjustable length section in its shortest configuration. FIG. 7 shows the section in its longest configuration.

DESCRIPTION OF THE PREFERRED EMBODIMENT

Figure 1:
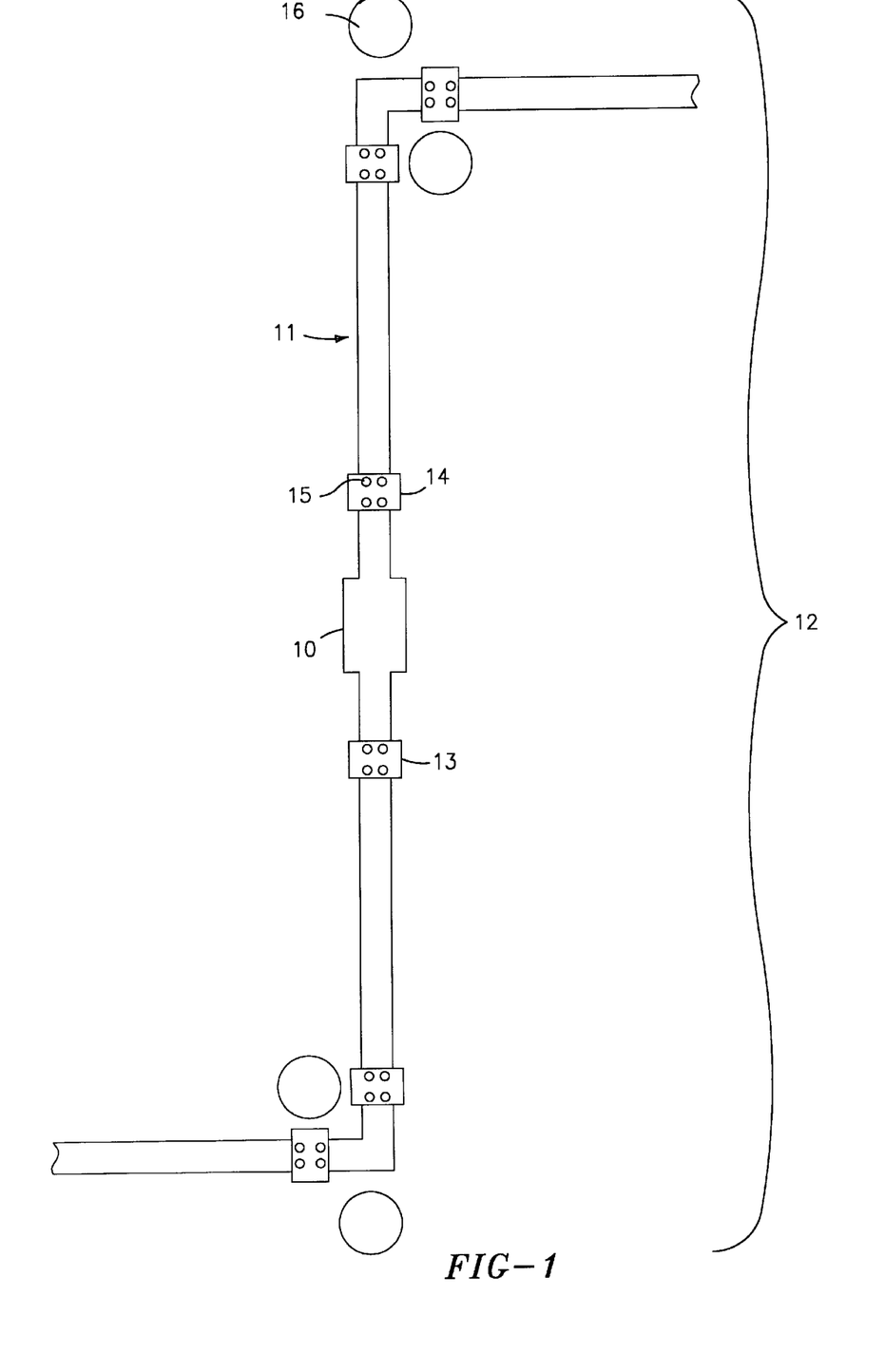
FIG. 1 is a fragmentary view of a busway run including several fixed length sections and one adjustable length section.

FIG. 1 shows an electric power system with several fixed length sections 11, a single adjustable length section 10, joint covers 14 and joint screws 15 connecting the adjustable section built accordance with the instant invention to the fixed length sections 11. The fixed length sections 11 and adjustable length section 10 are joined end to end preferably with a joint such as removable splice-plate joint as described in the copending U.S. patent application Ser. No. 08/411,256, filed on Mar. 27, 1995, titled "Electrical Power Busway System Connector Joint," commonly assigned to General Electric Company and which is hereby incorporated for the purpose of reference. During the design and installation of many busway runs, it is often necessary to maneuver a busway between obstructions 16 such as pipes, columns, and walls which limit the variation in length of a potential busway run, requiring busway sections of unique length to fit each particular location. Available use of adjustable length busway section 10 eliminates the need to costly fabricate a special section for such an application.

Figure 2:
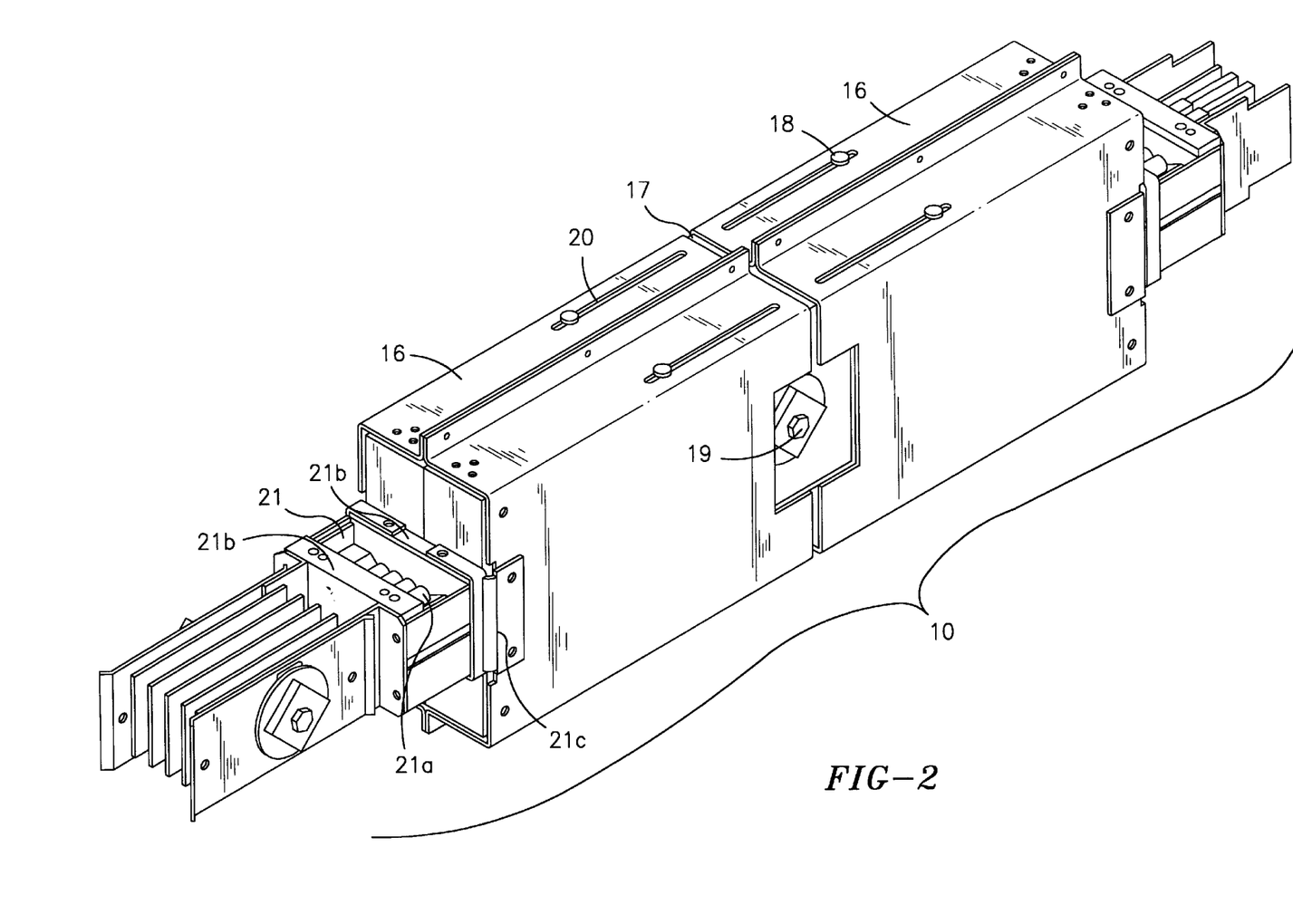
Figure 3:
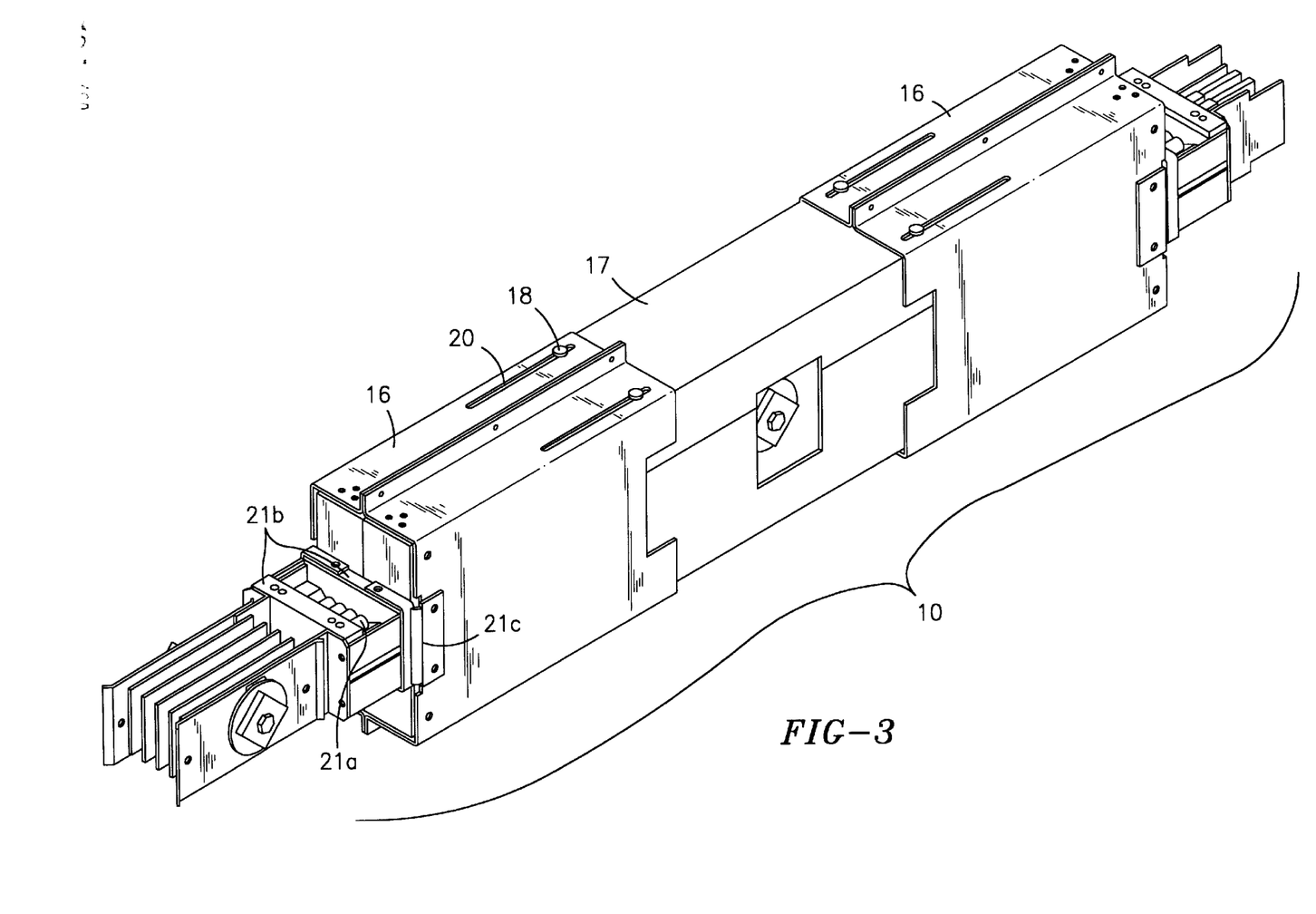

FIGS. 2 and 3 show the adjustable length section at its minimum and maximum length, respectively. Side housing sections 16 and center housing section 17 telescope over each other during length adjustment. The end stubs 21 are constructed in a manner similar to that described in co-pending U.S. Patent Application Docket No. 41PR-7353 titled "Thermally Efficient Power Busway System With Integral Clamping Mechanism," commonly assigned to General Electric Company, which is hereby incorporated for the purpose of reference. There are two end stubs 21, each of which connects one slidable side housing section 16 via fasteners 21c. Each end stub 21 comprises a housing section 21a which encloses the bus bar conductors within and two clamping braces 21b. The clamping braces 21b help retain the bus bar conductors in place and provide mechanical support to the end stubs as well as means to connect the enclosed bus bar conductors to the side housing sections. A clamping means, such as a splice-plate joint bolt 19 at the center section 17, exerts pressure on the contact portions of the bus bars and allows the bus bar conductors within to move relative to the center housing section 17. Fasteners, such as housing screws 18 at the top and bottom (not shown) of the two end sections 16 allow the telescoping end sections to move laterally relative to the center section 17 along the housing slots 20 at the top and bottom (not shown) of the side housing sections.

To adjust the length of the busway section 10, housing screws 18 and center splice-plate joint bolt 19 are first loosened. The joint bolt 19 is loosened to manipulate the bus bars from their operable position, and the housing screws 18 are loosened to slide the outside side housing sections 16 toward or away from one another to adjust the length of the housing. As the outside side housing sections 16 are moved, the bus bar conductors inside are moved relative to the movement of the end sections. After a desirable length is obtained, the screws 18 and bolt 19 are then tightened to provide mechanical stability and electrical conductivity to the section.

In FIG. 2, the adjustable length section 10 is at its minimum length with the housing screws 18 at the far left and far right corner of the left and right housing slots 20, respectively. The two side housing sections 16 fully telescope over the center housing section 17 when the section 10 is at its minimum length.

FIG. 3 shows the same adjustable straight section of FIG. 2 in its longest configuration. Note that housing screws 18 remain in the same position relative to the center section 17, while the two end sections 16 are pulled away from the center section 17 along housing slots 20, exposing the center housing section 17 as the busway section 10 is adjusted to its maximum length.

Figure 4:
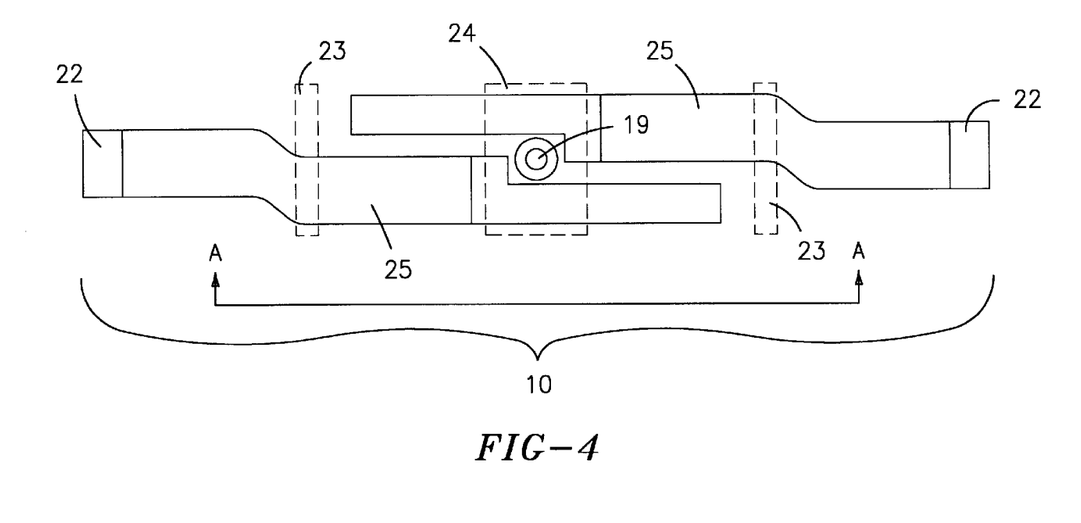
FIG. 4 and 5 are top views of an adjustable length section with all housing sections removed to show the internal bus bar conductor and supporting braces.
Figure 5:
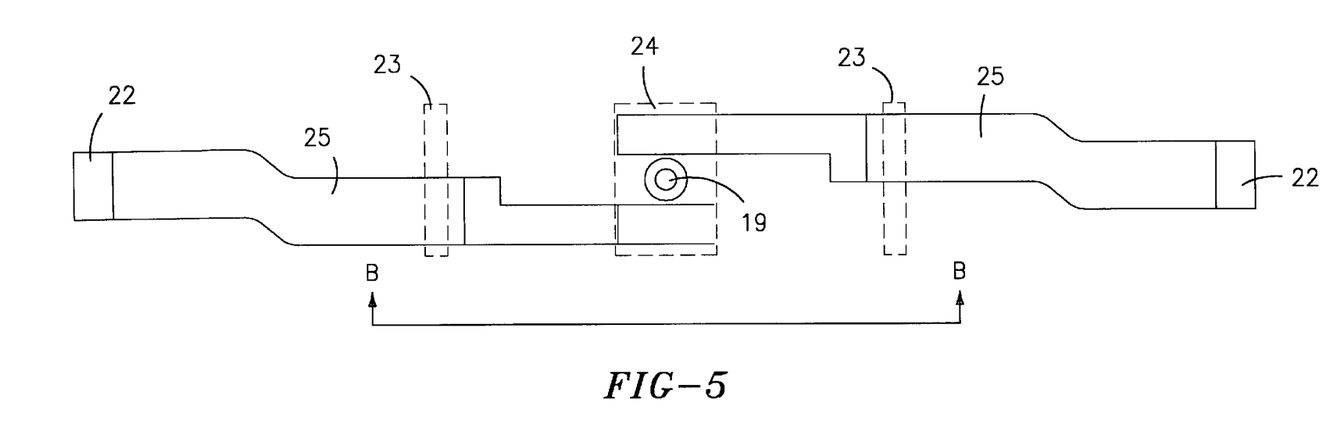

FIGS. 4 and 5 are top views of the adjustable section of FIGS. 2 and 3, with the center housing section 17 and two side housing sections 16 removed to show the bus bar conductors inside as the adjustable section 10 at its minimum and maximum length, respectively. Shown at the center of the adjustable section is a splice-plate joint 24 and joint bolt 19. The splice-plate joint 24 is described in the aforementioned U.S. patent application Ser. No. 08/411,256 showing the joint configuration and assembly. Two bus bar conductors 22 insulated by an epoxy coat are at two opposite sides of the center joint bolt 19 and splice-plate joint 24. In the preferred embodiment, the two adjoining bus bars are offset relative to one another, but still on the same plane to retain a center-line alignment. There are two support braces 23 providing mechanical support for the bus bars to withstand short-circuit conditions or external forces. The bus bar supports 23 remain fixed in position relative to the joint bolt 19 and splice-plate joint 24, allowing the adjoining bus bars 22 to move freely between as the side housing pieces are slidable over the center housing piece. When the joint bolt 19 is loosened, adjoining bus bars 22 can freely move relative to the splice-joint 24 within the bracing of support braces 23. The bus bar conductors 22 are coated with an epoxy coat to the extent necessary to provide the required minimum through-air clearances between bus bars of dissimilar phases.

Figure 6:
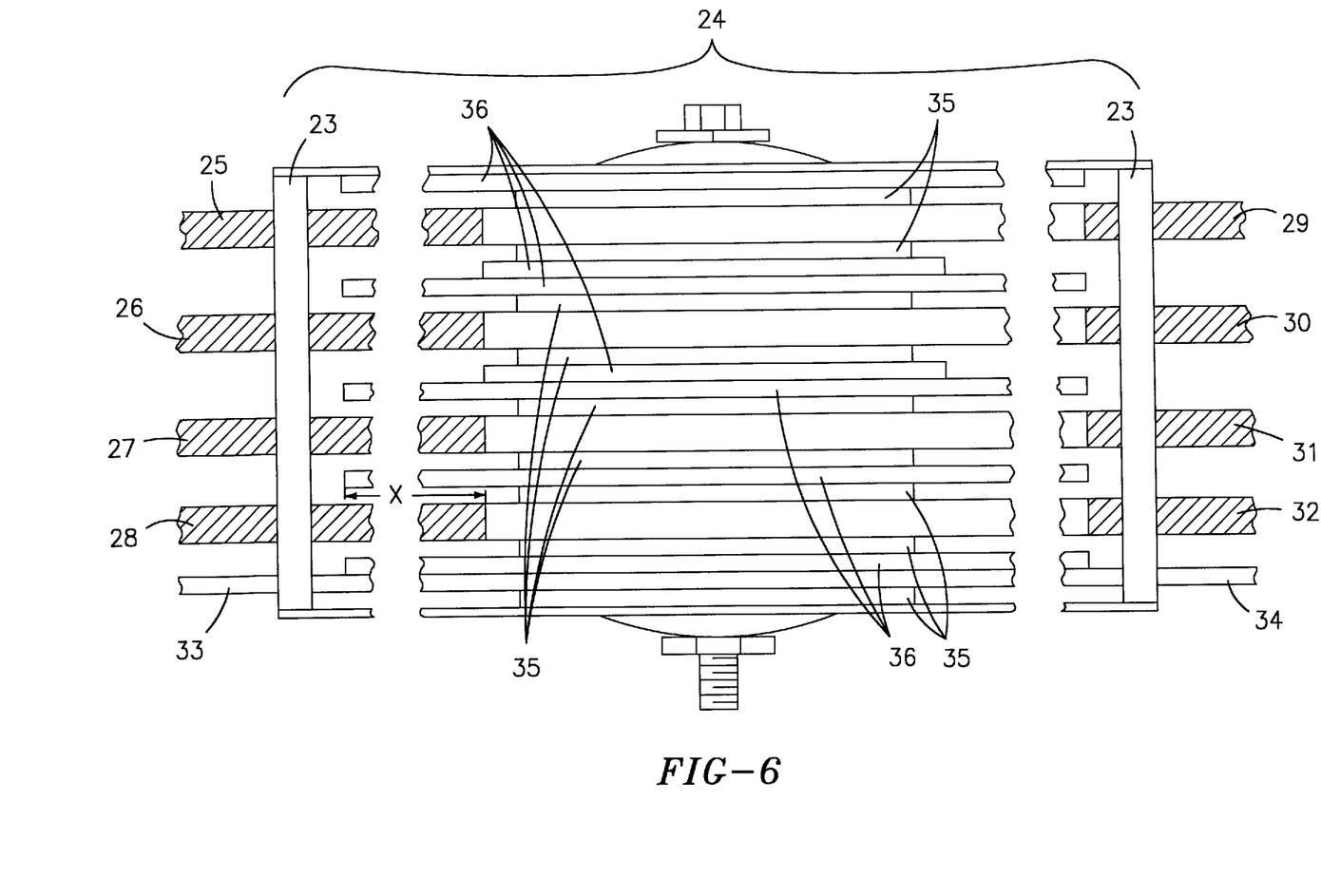
FIG. 6 and 7 are side elevations of an adjustable length having all housing sections removed showing the center region of the section with the bus bar braces and sliding joint.

FIG. 6 is a side elevation of the center region of the adjustable length section 10 with the overall adjustable length set at its minimum, showing the area under the center housing section 17. The multi-phase bus bars 25 through 32 and ground bars 33 and 34 are at the two opposite sides of the splice-plate joint 24. The splice plates 35 are located adjacent to the phase and ground bars to collect and distribute current to adjoining bus bar conductors on either side of the splice-plate joint. For example, left A-phase bar 25 transfers current into splice plates 35, which then transfer current into right A-phase bar 29. Bus bar support braces 23, which are connected to the center housing section 17, are at a fixed position relative to the splice-plate joint 24 and joint bolt 19. Insulative sheets 36 separate each busbar so that they remain electrically independent. Insulative coating on the bus bars maintains minimum through-air clearance "X" between bus bars of dissimilar phases.

Figure 7:
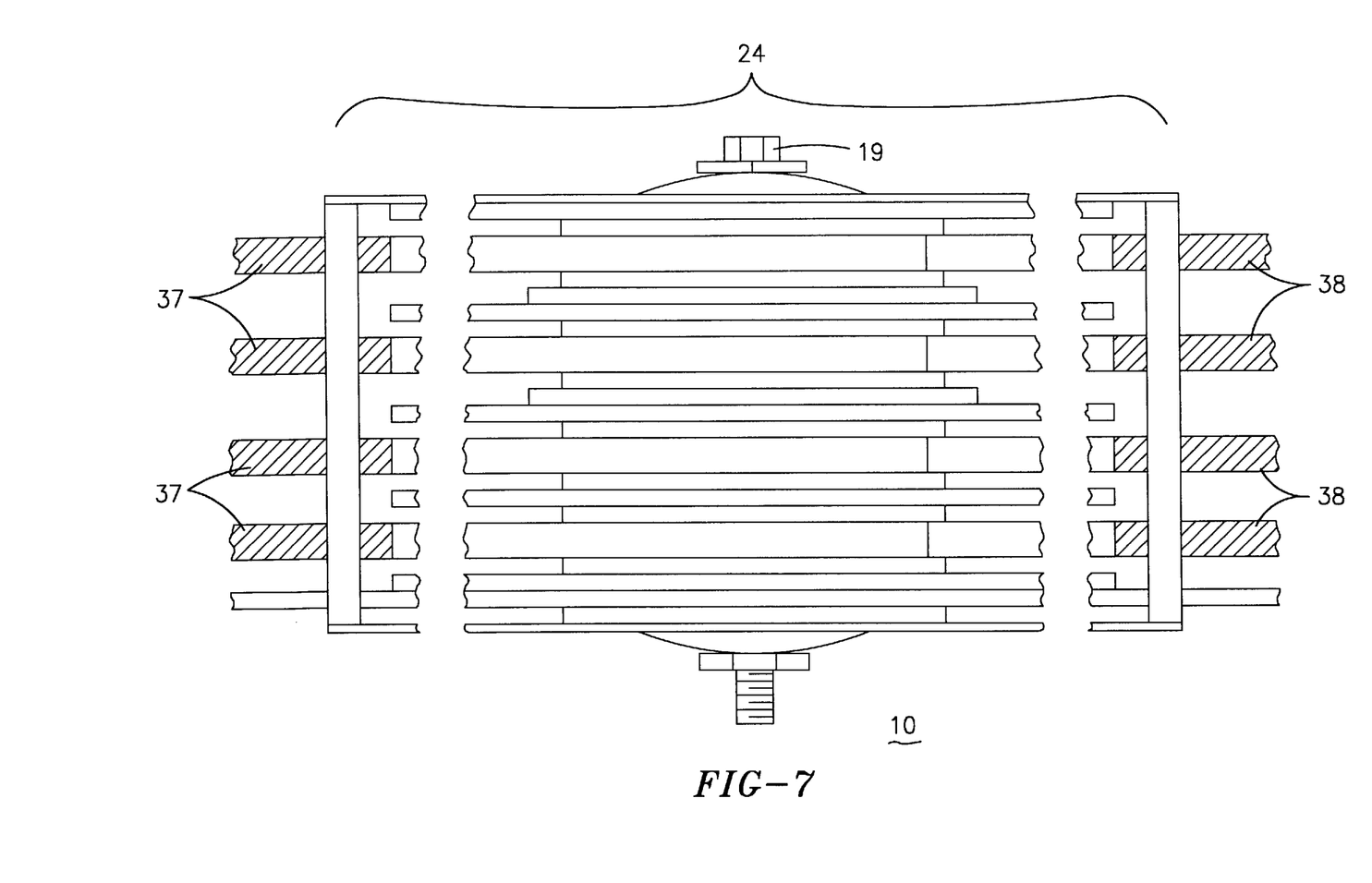

FIG. 7 shows the bus bar configuration of FIG. 6 when the adjustable section 10 is set to its maximum. The joint bolt 19 is first loosened to manipulate the bus bars from their operable position. As the outside end sections 16 (not shown) are moved further away from one another, left bus bars 37 are moved to the left relative to the splice-plate joint 24, while right bus bars 38 are moved to the right relative to the splice-plate joint 24. After the desirable section length 10 is obtained, the joint bolt 19 is then tightened.

Figure 8:
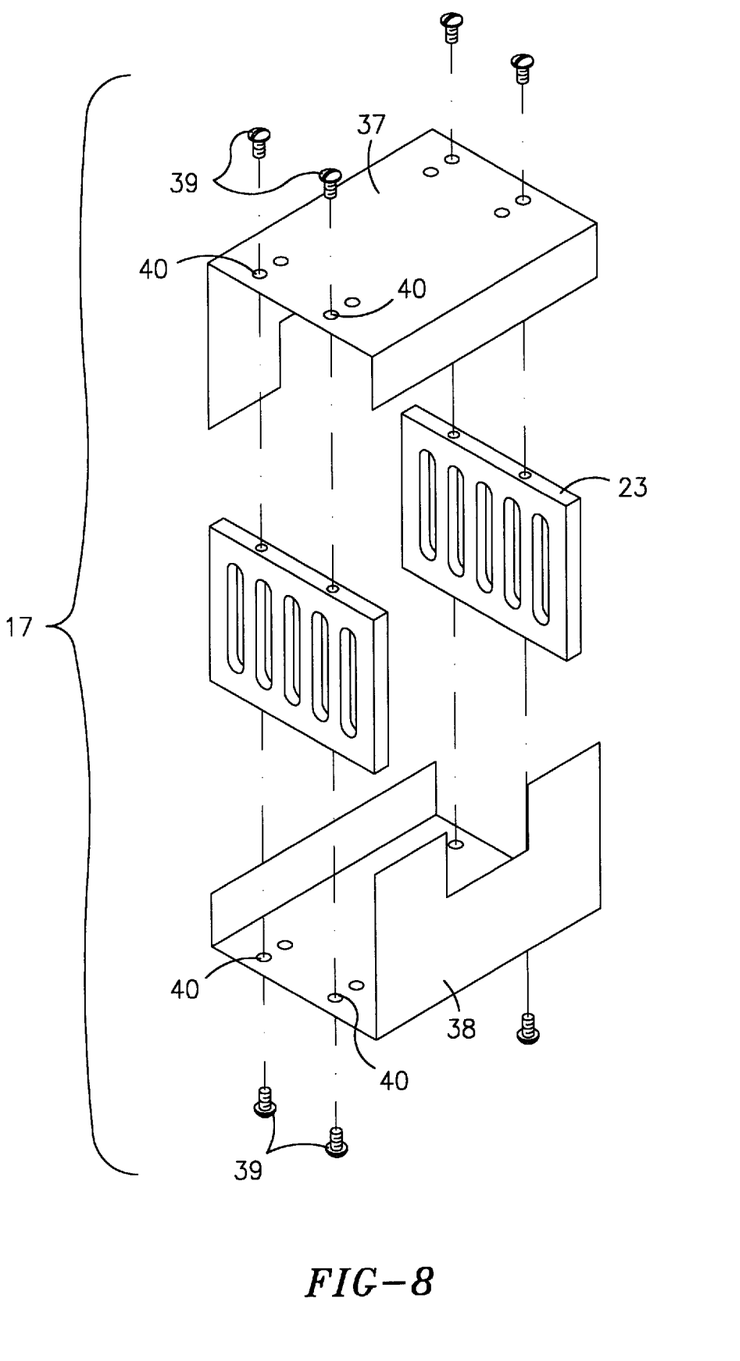
FIG. 8 is an exploded isometric view of the center housing section, with all of the conducting and insulating parts removed to highlight the housing attachment.

FIG. 8 shows the assembly of the center housing section 16, which comprises a top housing plate 37 and bottom housing plate 38. Support screws 39 through support holes 40 fasten the top and bottom housing plates to supports braces 23.

Figure 9:
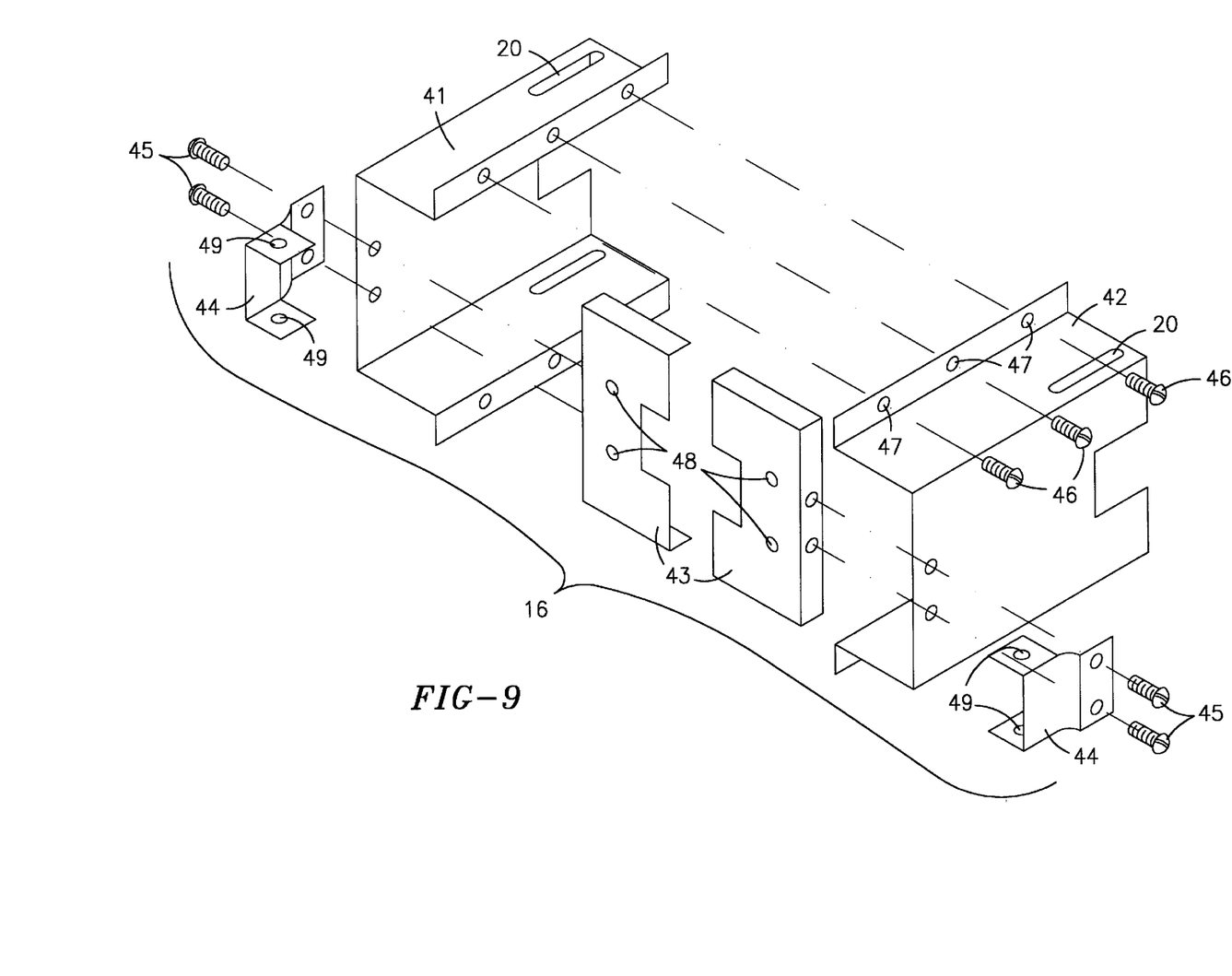
FIG. 9 is an exploded isometric view of one of the side housing sections, with all of the conducting and insulating parts removed to the highlight housing attachment.

FIG. 9 shows the assembly of a side housing section 16. Left housing part 41 and right housing part 42 are attached to support sheets 43 and retaining sheets 44 with side screws 45. Slotted holes 20 are at the top and bottom in each left and right housing part 41 and 42 for the movement of housing screw 18 (not shown) as the section length is adjusted. The left and right housing pieces 41 and 42 are attached to each other with attachment screws 46 through mating holes 47. Screws going through the side auxiliary holes 48 in support sheets 43, and clamp auxiliary holes 49 in retaining sheets 44, and the slotted holes 20 in left and right housings 41 and 42 to attach the assembly of the side housing section 16 to the center housing section 17 and the clamping block 21b of the end stubs 21 (as shown in FIG. 2).

What is claimed is:

1. An adjustable length bus section comprising:
   a center housing section and first and second side housing sections respectively in axial alignment with, telescoping over and slidably connected to said center housing section;
   first and second sets of electrically insulated bus bar conductors disposed within said first and second side housing sections, respectively, said first and second sets of bus bar conductors being at a 180 degree opposing angle with respect to one another, said first and second sets of bus bar conductors having overlapping slidable contact portions;
   clamping means for connecting the contact portions of said bus bar conductors and exerting clamping pressure on said contact portions to urge them in firm electrical contact engagement;

means for joining said first and second sets of bus bar conductors to said first and second side housing sections, respectively, allowing said bus bar conductors to move along with said first and second side housing sections while said first and second side housing sections are slidably moved; and connecting means for connecting said center housing section to said first and second side housing sections, said connecting means being in axial alignment allowing said first and second side housing sections to slidably move along said center housing section in longitudinal movement.

2. The adjustable length bus section of claim 1, wherein said bus bar conductors are offset relative to one another.

3. The adjustable length bus section of claim 2, wherein said clamping means includes a splice-plate joint bolt.

4. The adjustable length bus section of claim 1, further comprising:

at least two support braces providing support for said bus bar conductors, each of said support braces being attached to an opposite end of the center housing section.

5. The adjustable length bus section of claim 1, wherein said connecting means for connecting said center housing section to said first and second side housing sections includes:

at least one horizontal slot along the length of said first side housing section and at least one horizontal slot along the length of said second side housing section, said horizontal slots being in axial alignment; and fasteners going through said slots, fastening said first and second side housing sections to said center housing section, allowing said first and second side housing sections to slidably move relative to said center housing section along said horizontal slots in longitudinal movement.

6. The adjustable section length bus section of claim 1, further comprising a housing duct for said bus bar conductors.

7. The adjustable section length bus section of claim 6, further comprising at least one clamping brace being attached to said housing duct retaining said bus bar conductors in position within said housing duct.

8. The adjustable section length bus section of claim 5, wherein said fasteners further connect said bus bar conductors to said first and second side housing sections, thereby allowing said bus bar conductors to cooperatively move along with said first and second side housing sections.

* * * * *